(12) United States Patent
Moore

(10) Patent No.: US 6,233,033 B1
(45) Date of Patent: May 15, 2001

(54) PIXEL ARRAY FOR LC SILICON LIGHT VALVE FEATURING PIXELS WITH OVERLAPPING EDGES

(75) Inventor: Paul McKay Moore, San Bruno, CA (US)

(73) Assignee: National Semiconductor Corp., Santa Clara, CA (US)

( * ) Notice: Subject to any disclaimer, the term of this patent is extended or adjusted under 35 U.S.C. 154(b) by 0 days.

(21) Appl. No.: 09/280,753

(22) Filed: Mar. 29, 1999

(51) Int. Cl.[7] .................. G02F 1/1343; G02F 1/1347; H01L 21/00; H01L 21/82; G03C 5/00
(52) U.S. Cl. ...................... 349/139; 349/74; 438/30; 438/38; 438/128; 430/311; 430/319
(58) Field of Search .................. 438/30, 38, 29, 438/39, 128, 689, 692; 349/74, 77, 84, 187, 25, 139, 156; 430/311, 317, 319, 314

(56) References Cited

U.S. PATENT DOCUMENTS

| | | | |
|---|---|---|---|
| 4,185,894 | 1/1980 | Hilton et al. | 350/338 |
| 4,999,619 | 3/1991 | Velde | 340/784 |
| 5,473,448 | 12/1995 | Yoshinaga et al. | 359/51 |
| 5,515,191 | 5/1996 | Swirbel | 359/54 |
| 5,543,946 | 8/1996 | Enomoto et al. | 359/87 |
| 5,570,213 | 10/1996 | Ruiz et al. | 359/72 |
| 5,672,937 | 9/1997 | Choi et al. | 313/503 |
| 5,702,871 | 12/1997 | Choi et al. | 430/314 |
| 5,706,067 | 1/1998 | Colgan et al. | 349/114 |
| 5,754,159 | 5/1998 | Wood et al. | 345/102 |
| 5,764,324 | 6/1998 | Lu et al. | 349/113 |
| 5,838,715 | 11/1998 | Corzine et al. | 372/96 |
| 5,867,237 | 2/1999 | Yazaki et al. | 349/86 |
| 6,008,876 | * 12/1999 | Moore | 349/139 |
| 6,159,847 | * 12/2000 | Haveman et al. | 438/652 |

OTHER PUBLICATIONS

Colgan, E.G., et al., "On–Chip Metallization Layers for Reflective Light Valves", IBM J. Res. Develop. vol. 42 No. 3/4 May/Jul. 1998, pp. 339–345.

Takayama, S., et al., "Effects of Y or Gd Addition on the Structures and Resistivitives of Al Thin Films", J. Vac. Sci. Technol. A 14(4), Jul./Aug. 1996, pp. 2499–2504.

Takayama, S., et al., "Low Resistivity Al–RE (RE=La, Pr, and Nd) Alloy Thin Films with High Thermal Stability for Thin–Film–Transistor Interconnects", J. Vac. Sci. Technol. B 14(5), Sep./Oct. 1996, pp. 3257–3262.

O'Hara, A., et al., "Planarisation of Spatial Light Modulator Silicon Back–Planes Using Chemical–Mechanical Polishing", 1994 The Institution of Electrical Engineers, publishes by IEE, Savoy Place, London WC2R OBL. UK, pp. 5/1–5/6.

Castleberry, D. E., et al., "A 1 Mega–Pixel Color a–Si TFT Liquid–Crystal Display", SID 88 Digest, First Ed., May 1987, ISSN 0097–966X, pp. 232–234.

Glueck, J., et al., "Color–TV Projection with Fast–Switching Reflective HAN–Mode Light Valves", SID 92 Digest, ISSN 0097–0966X, p. 277280.

* cited by examiner

*Primary Examiner*—William L. Sikes
*Assistant Examiner*—Quynh-Nhu H. Vu
(74) *Attorney, Agent, or Firm*—Stallman & Pollock LLP

(57) ABSTRACT

The present invention provides a pixel array and a process flow for forming an array of pixel cells that features pixel electrodes having overlapping edges. This overlapping pixel configuration precludes absorption of light in inter-pixel regions that could give rise to the appearance of dark lines between bright reflective pixel electrodes. This pixel arrangement also prevents the disruption of charge stored in underlying capacitor structures due to the penetration of incident light through inter-pixel regions into the underlying substrate.

5 Claims, 18 Drawing Sheets

PIXEL ARRAY FOR LC SILICON LIGHT VALVE FEATURING PIXELS WITH OVERLAPPING EDGES

BACKGROUND OF THE INVENTION

1. Field of the Invention

The present invention relates to light valves, and in particular, to pixel cell arrays for silicon light valves having pixels whose edges overlap in order to maintain reflectance in inter-pixel regions.

2. Description of the Related Art

Liquid crystal displays (LCDs) are becoming increasingly prevalent in high-density projection display devices. These display devices typically include a light source which passes light through a light valve.

One of the methods for producing colors in a liquid crystal display is to sequentially project light having a wavelength corresponding to a primary color onto a single light valve. Color sequential light valves create a spectrum of color within the range of the human perception by switching between a set of discrete primary colors. Typically, red, green, and blue are the primary tri-stimulus colors used to create the remaining colors of the spectrum.

Specifically, during projection of each primary color, the light intensity is modulated such that combination of the intensities of the primary colors in sequence produces the desired color. The frequency of switching between the primary wavelengths by the light valve should be sufficiently rapid to render discrete primary states indistinguishable to the human eye.

Two factors dictate the minimum frequency necessary for switching. The first factor is the ability of the human eye to detect the discrete primary colors (e.g., red, green, blue). At slower than ideal switching speeds, the human eye will detect a flicker and the primaries may not blend.

The second factor determining the frequency of switching is the video refresh rate. During display of video images, the individual frames must be refreshed at frequencies undetectable to the human eye.

The net frequency of switching demanded by the combination of sequential color blending and video refreshing is beyond the capabilities of light valves that utilize thick (>1 $\mu$m) liquid crystal (LC) transducers. However, thin (<1 $\mu$m) liquid crystal transducers have been successfully fabricated. These thin LC transducers demonstrate adequate color sequential blending at video refresh rates. One example of such a thin LC transducer pixel cell structure is disclosed in U.S. Pat. No. 5,706,067, to Colgan et al.

In general, the conventional thin LC transducer pixel cells possess enhanced responsiveness due to the decreased volume of liquid crystal material between the top and bottom plates. A smaller volume enables the liquid crystal to shift orientation more quickly and in response to a lower applied voltage.

FIG. 1 shows a cross-sectional view of adjacent thin LC transducer pixel cells in a conventional light valve. Light valve portion 100 comprises adjacent pixel cells 110a and 110b having liquid crystal (LC) material 111 sandwiched within gap 106 between a top plate and a bottom plate. Top plate 102 is composed of a translucent material, typically glass. The bottom plate is formed by the reflective metal pixel electrodes 112a and 112b of adjacent pixels 110a and 110b, respectively.

Pixel electrodes 112a and 112b are separated and electrically isolated by trench 118. Pixel electrodes 112a and 112b lie on top of an upper intermetal dielectric layer 128 that is one component of interconnect scheme 104. Interconnect 104 overlies capacitor structures 118a and 118b formed within underlying silicon substrate 105. Underlying capacitors 118a and 118b are in electrical communication with pixel electrodes 112a and 112b, respectively, through metal-filled vias 140 and middle interconnect metallization layer 124 and lower interconnect metallization layer 122.

The conventional pixel array described above in FIG. 1 functions adequately in many applications. However, this design suffers from a number of disadvantages.

One problem is that light incident to array 100 may penetrate through trench 118 between adjacent pixel electrodes 112a and 112b. Intermetal dielectric layer 128 below trench 118 is substantially transparent to this incident light, which next encounters interconnect metallization layer 124. Metallization layer 124 likely bears an anti-reflective coating as a result of prior photolithographic steps. As a result, light incident to inter-pixel regions is absorbed rather than reflected, and is perceived by a viewer as a dark line. This dark inter-pixel region stands in stark contrast to the bright surrounding reflective pixel electrodes. Projection displays can in turn magnify the light reflected from pixel array to such an extent that non-reflective space between pixels is readily observable and may distort the image.

Therefore, there is a need in the art for a pixel array and a process of forming a pixel array where inter-pixel regions exhibit reflectance comparable to reflectance in pixel regions.

Another problem is that the penetration of light into inter-pixel regions can cause distortion of the image displayed by the light valve. Specifically, incident light can travel through a variety of paths in the interconnect and finally enter into the underlying silicon. Penetration of incident light into the silicon substrate induces electrical currents that disturb charge stored in the underlying capacitors. As a result of fluctuation in charge stored in these capacitors, luminance of the pixel cells may change between succeeding write states, causing the image to "flicker." This flickering reduces image quality, and may cause eye strain in a viewer.

Therefore, there is a need in the art for a pixel array and a process of forming a pixel array that substantially blocks the penetration of incident light through inter-pixel regions into the underlying substrate.

SUMMARY OF THE INVENTION

The present invention provides a pixel array and a process flow for forming an array of pixel cells which features pixel electrodes having overlapping edges. This overlapping electrode configuration precludes absorption of light in inter-pixel regions that could give rise to the appearance of dark lines between bright reflective pixel electrodes.

A process flow for forming a pixel cell array in accordance with a first embodiment of the present invention comprises the steps of forming an intermetal dielectric layer over an interconnect metallization layer, and forming a first dielectric layer over the intermetal dielectric layer. A second dielectric layer is then formed over the first dielectric layer, the second dielectric layer different than the first dielectric layer. Next, a trench photoresist mask is patterned over the second dielectric layer, the trench photoresist mask masking pixel regions and exposing inter-pixel regions. A trench is then created by etching the second dielectric layer and the first dielectric layer in inter-pixel regions to stop on the intermetal dielectric layer. The trench photoresist mask is removed, and a reflective metal layer is formed over the second dielectric layer and within the trench. A pixel photoresist mask is patterned over the reflective metal layer, the pixel photoresist mask masking first alternative pixel regions and exposing second alternative pixel regions. The reflective metal layer and the second dielectric layer are etched in second alternative pixel regions to stop on the first dielectric layer. A third dielectric layer is formed over the reflective metal layer in first alternative pixel regions and over the first dielectric layer in second alternative pixel regions. A second reflective metal layer over the third dielectric layer, the second reflective metal layer having a raised portion in first alternative pixel regions and a lower portion in second alternative pixel regions. A fourth dielectric layer is formed over the over the second reflective metal layer. Finally, chemical mechanical polishing is performed through the fourth dielectric layer, the raised portion of the second reflective metal layer, and the third dielectric layer to stop on the first reflective metal layer and the lower portion of the second reflective metal layer, such that first pixels are formed in first alternate pixel regions from the first reflective metal layer and second pixels are formed in the second alternate pixel regions from the lower portion of the reflective metal layer, the first and second pixels separated and electrically isolated from one another by the third dielectric layer.

A process flow for forming a pixel cell array in accordance with a second embodiment of the present invention comprises the steps of forming a layer of interconnect metallization, forming an intermetal dielectric layer on top of the interconnect metallization, and forming a plurality of electrically conducting vias extending through the intermetal dielectric to contact the interconnect metallization. Next, a first reflective metal layer is formed over the vias and the intermetal dielectric, and a first pixel photoresist mask is formed to cover first pixel regions and to exclude second pixel regions. The first reflective metal layer is etched in second pixel regions exposed by the first pixel photoresist mask, and the first pixel photoresist mask is removed. A first dielectric layer is formed over the intermetal dielectric, the vias, and first reflective metal layer remaining in the first pixel regions. A second reflective metal layer is formed over the first dielectric layer. A second pixel photoresist mask is formed over the second reflective metal layer to cover the second pixel regions and to expose the first pixel regions. Finally, the second reflective metal layer is etched in exposed first pixel regions selective to the first dielectric layer, and then the first dielectric layer is etched in exposed first pixel regions selective to the first reflective metal layer.

An apparatus in accordance with a first embodiment of the present invention comprises a plurality of first reflective metal pixel electrodes, and a plurality of second reflective metal pixel electrodes, the second electrodes having edges which project out of a plane of the first pixel electrodes, the edges of the second electrodes overlapping and separated from the first electrodes by a dielectric layer.

The features and advantages of the present invention will be understood upon consideration of the following detailed description of the invention and the accompanying drawings.

DETAILED DESCRIPTION

A pixel cell array in accordance with the present invention features pixels having overlapping edges. These overlapping edges provide a reflective metal surface to reflect incident light and thereby prevent absorption of light in inter-pixel regions that can give rise to the appearance of dark lines between the reflective pixel electrodes.

Figure 1:
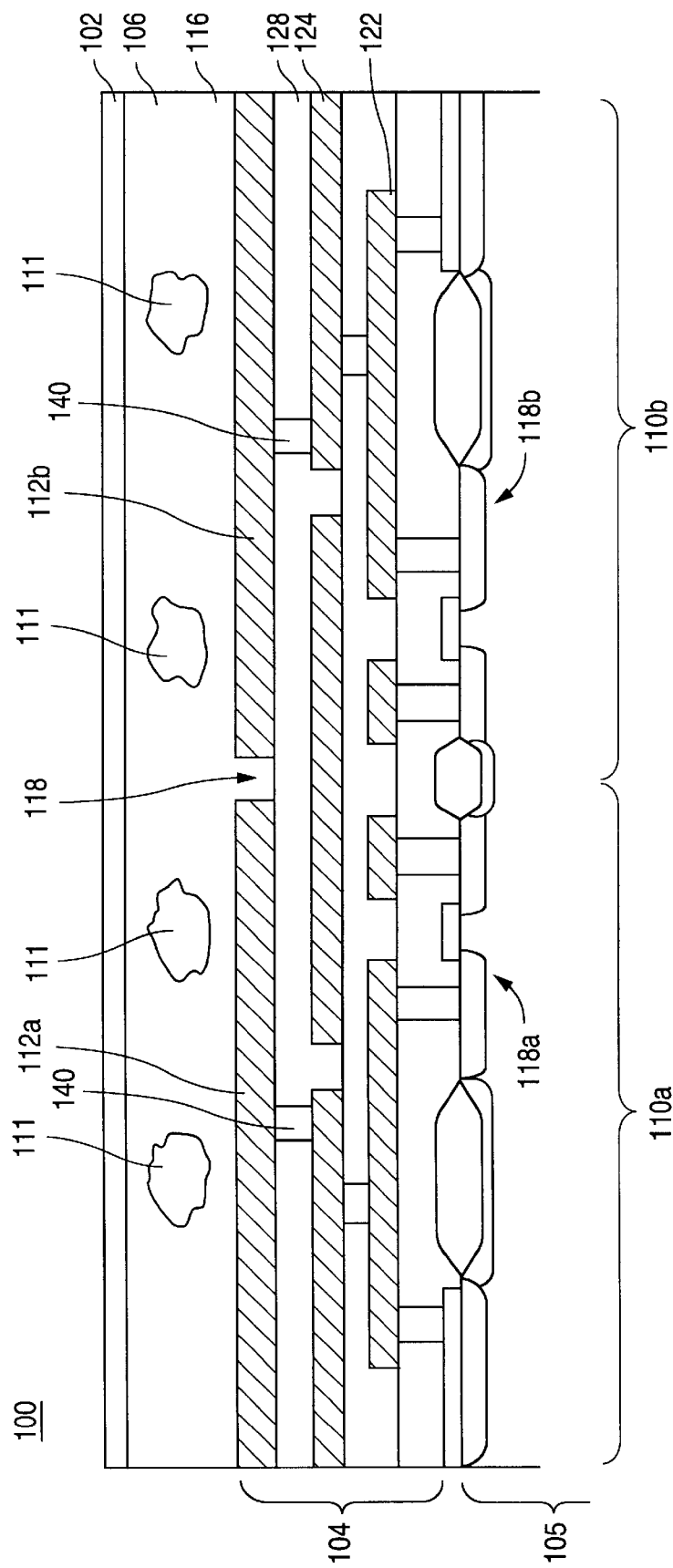
FIG. 1 shows a cross-sectional view of adjacent pixel cells in a conventional light valve.
Figure 2A:
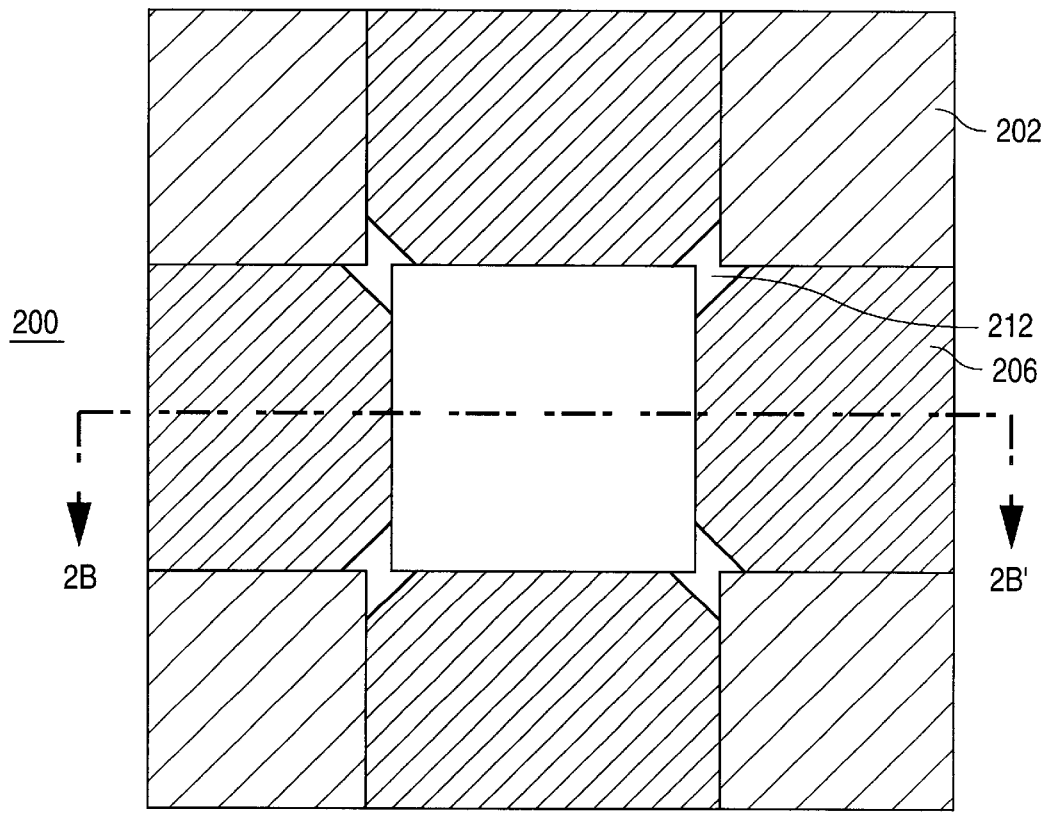
FIGS. 2A–2B show plan and cross-sectional views of adjacent pixel cells in a pixel array in accordance with a first embodiment of the present invention.
Figure 2B:
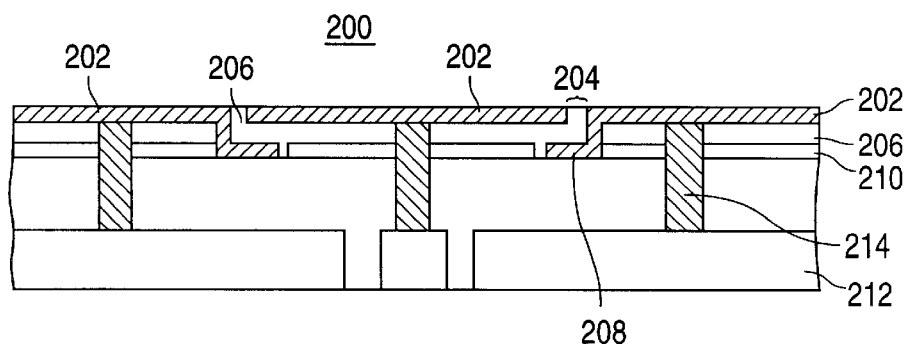

FIGS. 2A–2B show plan and cross-sectional views, respectively, of adjacent pixel cells in an array in accordance with a first embodiment of the present invention. Pixel array portion 200 includes adjacent pixel electrodes 202*a* and 202*b* separated by inter-pixel regions 204. Electrodes 202*a* and 202*b* are formed over intermetal dielectric layer 206, and communicate with underlying interconnect metallization layer 212 through metal-filled vias 214.

The underlying edges of first reflective pixel electrodes 202*a* underlie inter-pixel regions 204. The overlapping arrangement of adjacent electrodes 202*a* and 202*b* promotes the uniform brightness of the array. This is because the underlying edge of first reflective pixels 202*a* reflect incident light that has penetrated through dielectric layer 206 remaining in inter-pixel region 204. This ensures that dark lines indicating absorption of incident light do not appear in the light valve display.

Figure 3A:
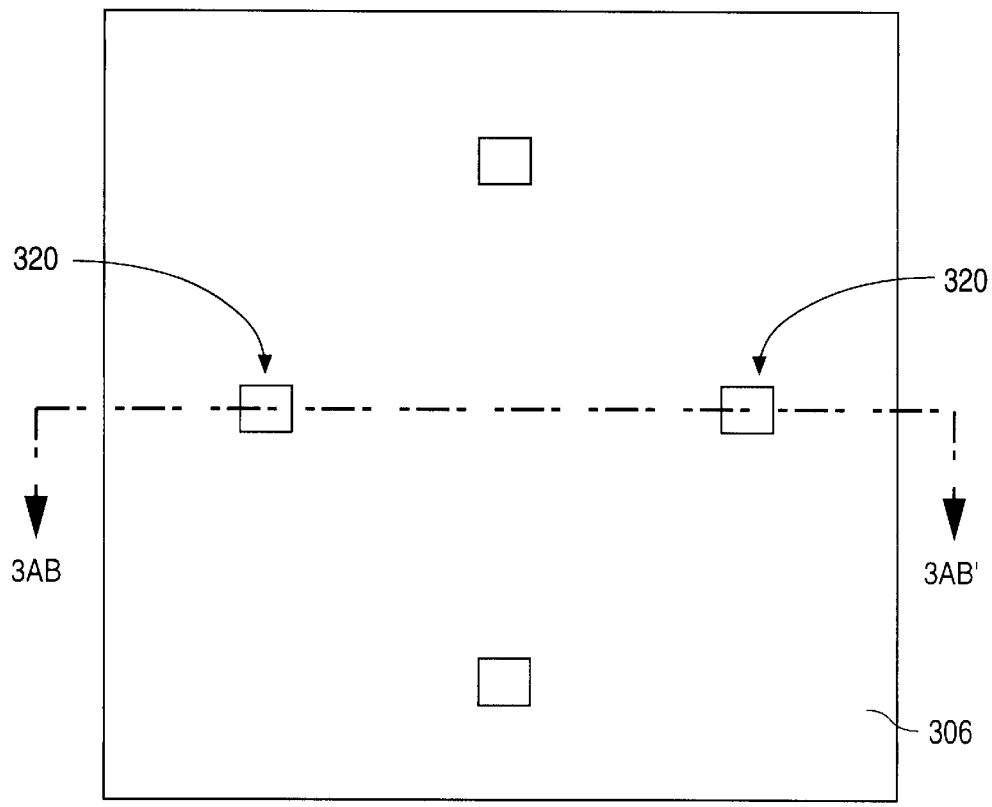
FIGS. 3AA–3HB show plan and cross-sectional views of the process steps for forming an array of pixel cells in accordance with the first embodiment of the present invention.
Figure 3A:
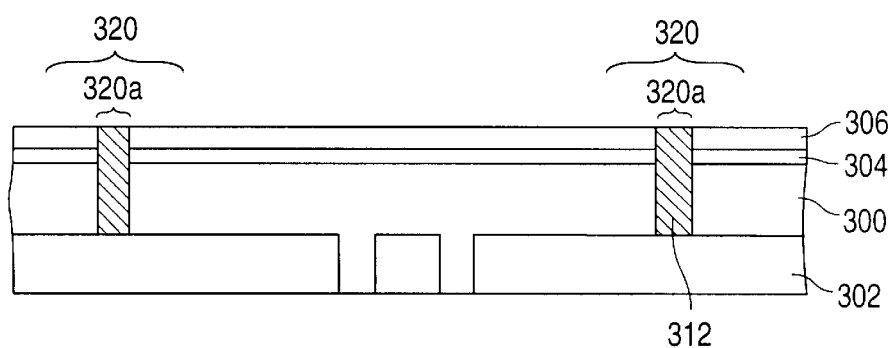

FIGS. 3AA–3IB illustrate the process steps for forming an array of pixel cells in a light valve in accordance with the first embodiment of the present invention. For purposes of convention, all FIG. 3XA illustrate a plan view of the pixel cell array, and all FIG. 3XB illustrate a cross-sectional view of the pixel cell array along line A–A' of the FIG. 3XA.

FIGS. 3AA–3AB illustrate the starting point for the process. Intermetal dielectric layer 300 is formed over interconnect metallization layer 302. First dielectric layer 304 is formed over intermetal dielectric 300, and second dielectric layer 306 is formed over first dielectric layer 304. First dielectric layer 304 (typically silicon nitride) is formed from a different material than second dielectric layer 306 (typically silicon oxide).

First vias 312 are etched in center portions 320*a* of first alternate pixel regions 320 through second dielectric layer 306, first dielectric layer 304, and intermetal dielectric layer 300 to stop on interconnect metallization layer 302. First vias 312 are then filled with electrically conducting material.

Figure 3B:
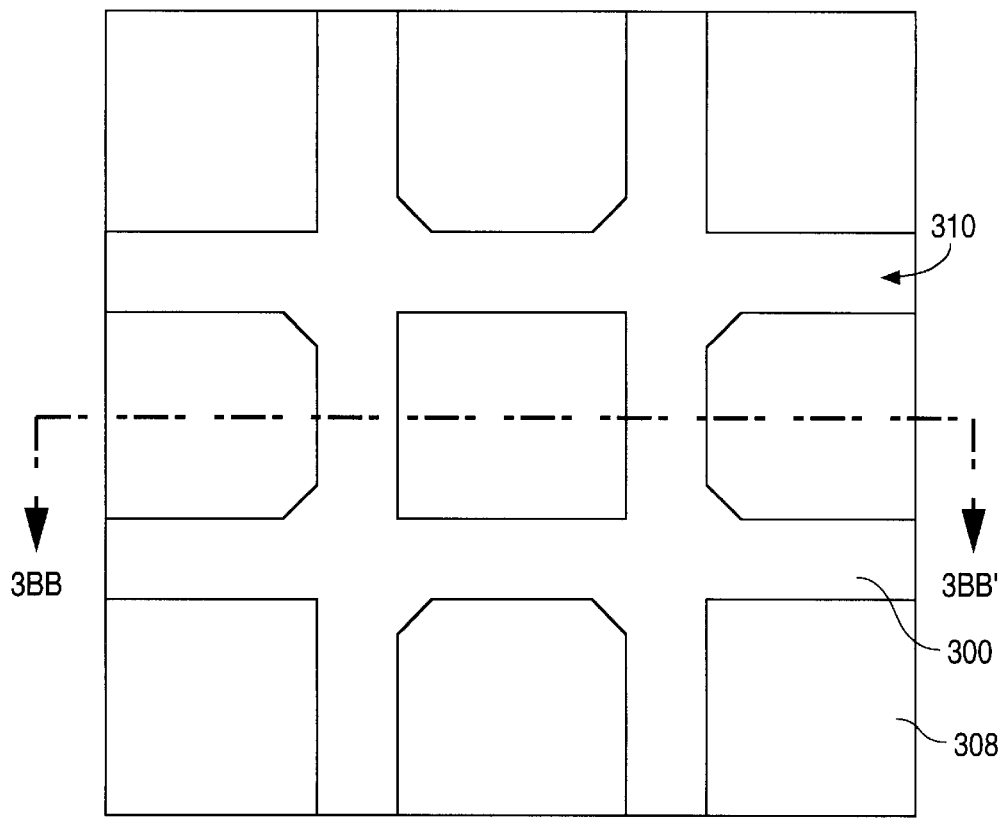
Figure 3B:
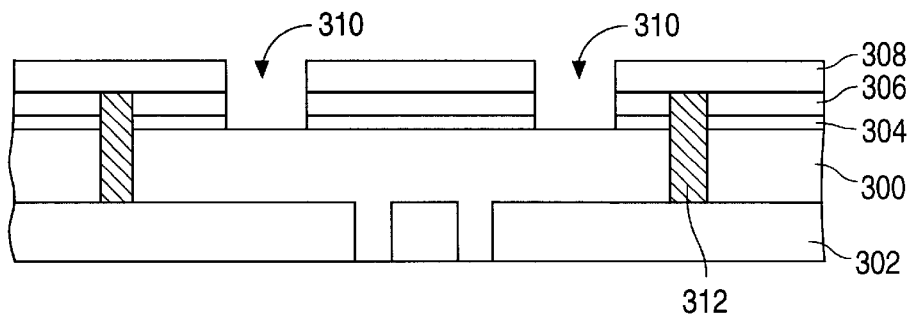
Figure 3C:
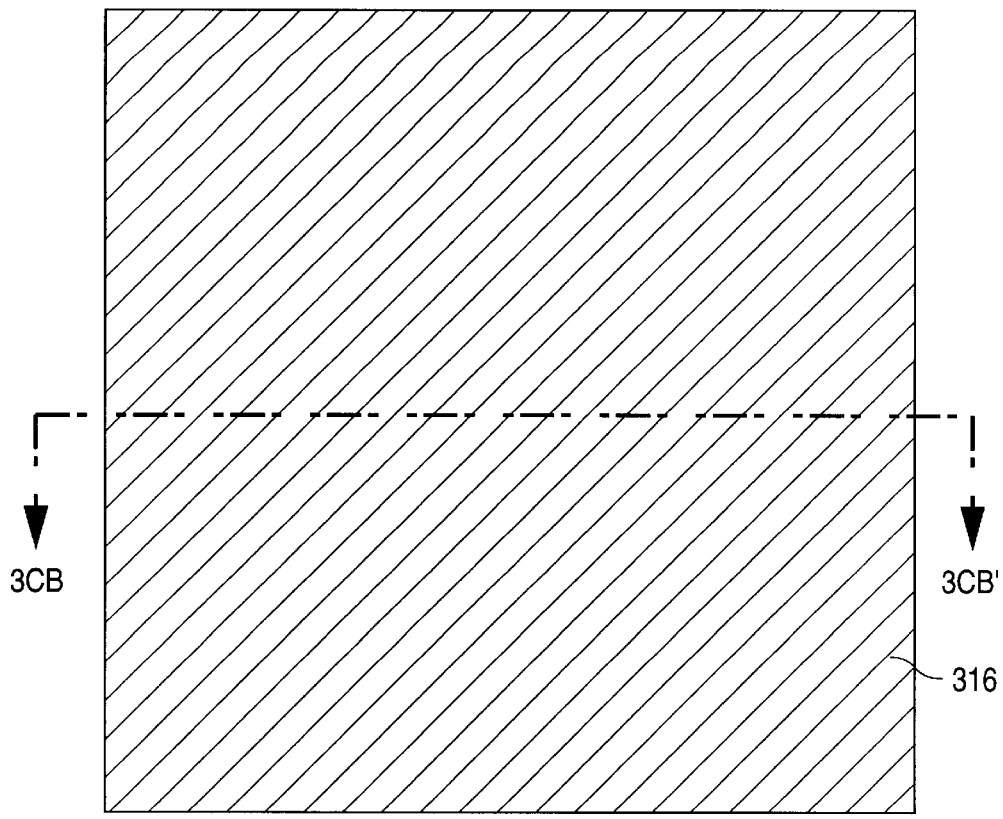
Figure 3C:
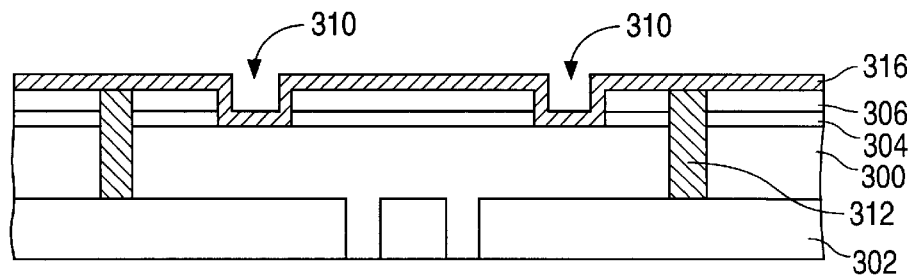

In FIGS. 3BA–3BB, first photoresist mask 308 is patterned over pixel regions, and second dielectric layer 306 and first dielectric layer 304 are etched to form trench 310 in inter-pixel regions. In FIGS. 3CA–3CB, first photoresist mask 308 is removed, and reflective metal layer 316 is formed over the entire surface, including within trench 310.

Figure 3D:
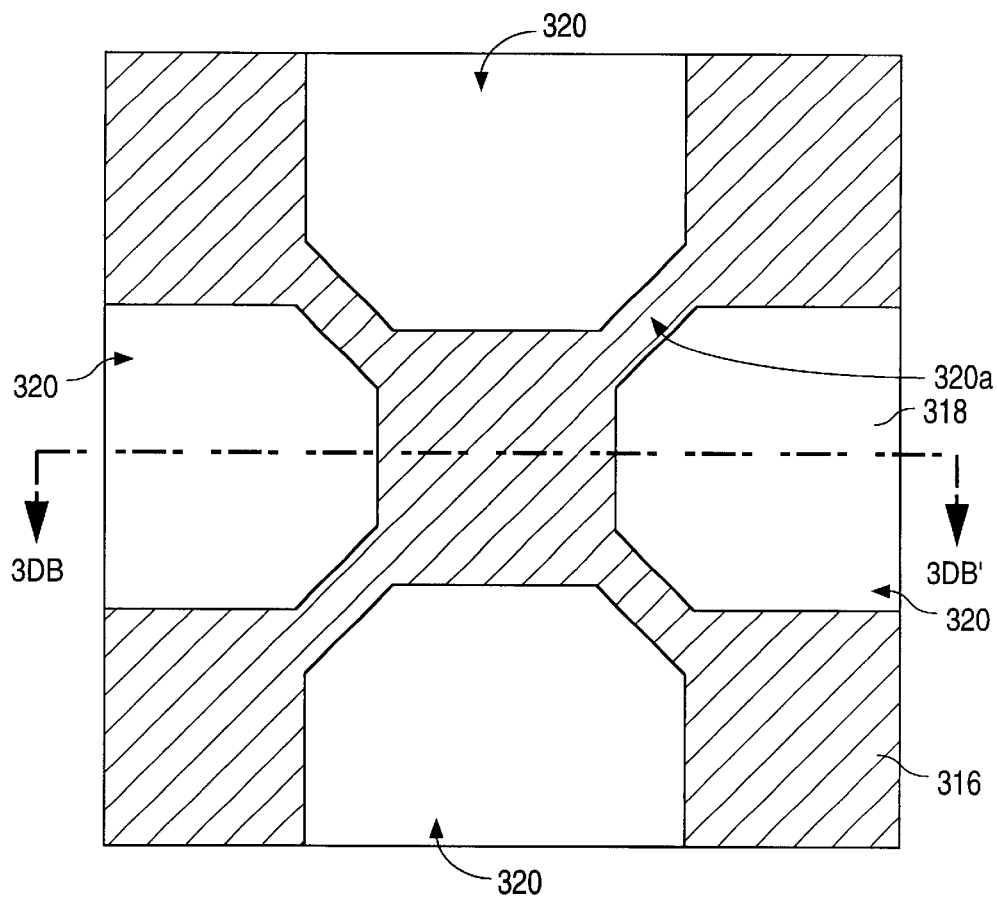
Figure 3D:
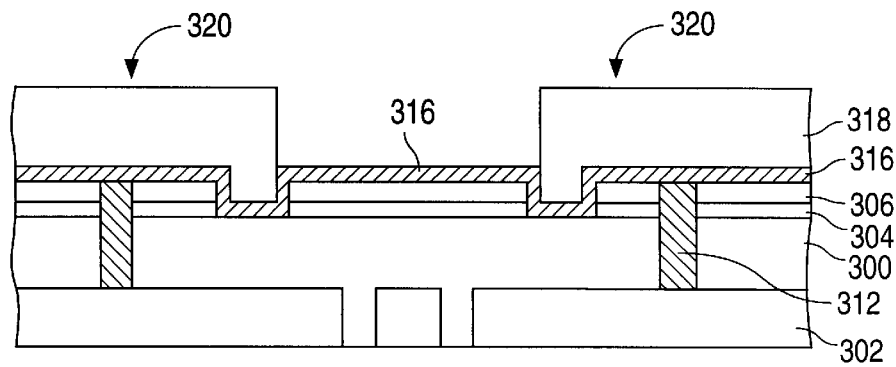

In FIGS. 3DA–3DB, second photoresist mask 318 is patterned over first alternate pixel regions 320, including the bottoms of trench 310. Second photoresist mask 318 forms a checkerboard pattern, with corners 320a of masked first alternate pixel regions 320 omitted in order to ensure adequate electrical isolation between diagonally-situated pixels.

Figure 3E:
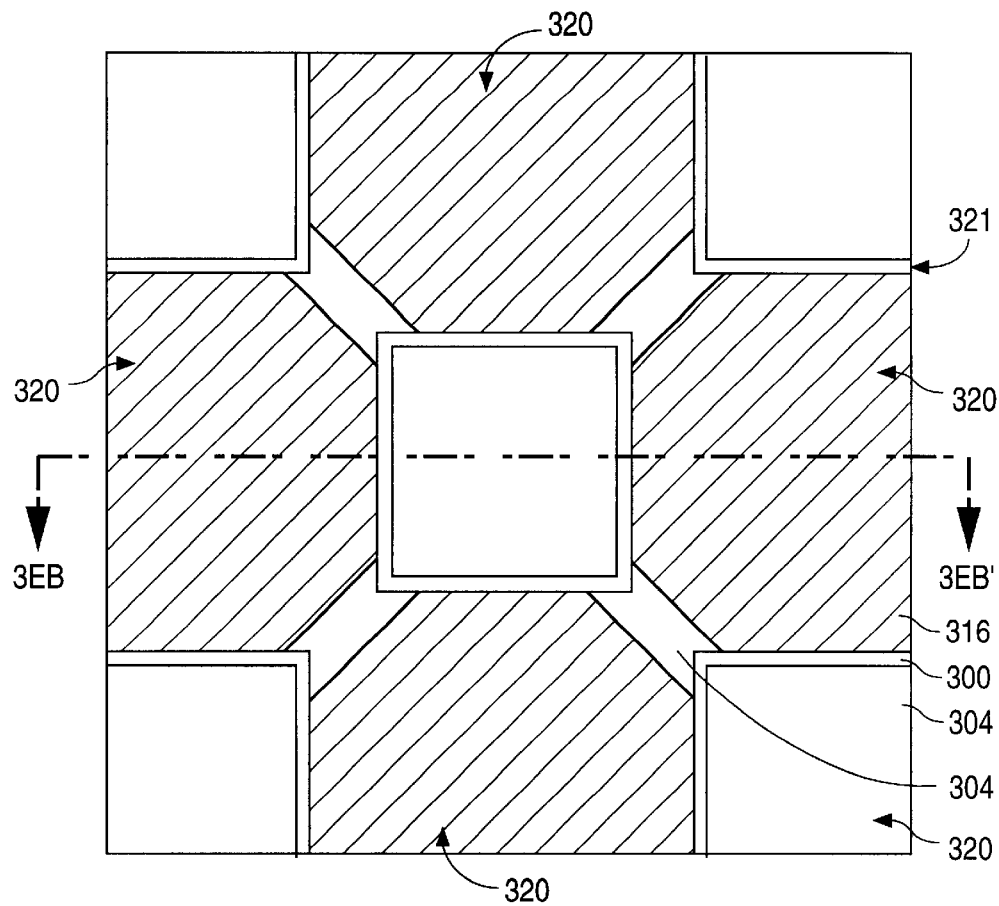
Figure 3E:
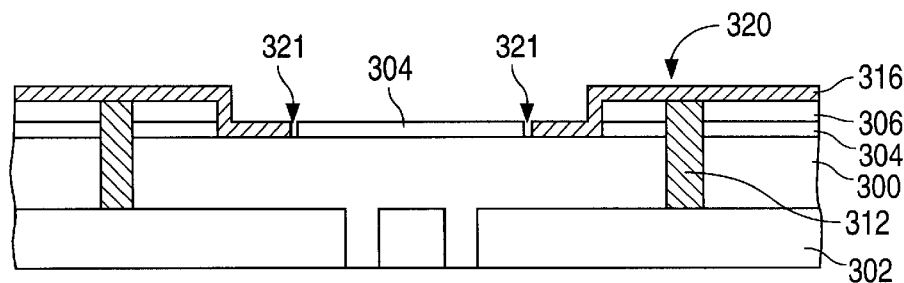

FIGS. 3EA–3EB show etching of first metal layer 316 and underlying second dielectric layer 306 in regions unmasked by second photoresist mask 318. Where first reflective metal layer 316 has conformed to a trench sidewall, first reflective metal layer 316 will be removed all of the way down to underlying intermetal dielectric 300, creating gap 321.

Figure 3F:
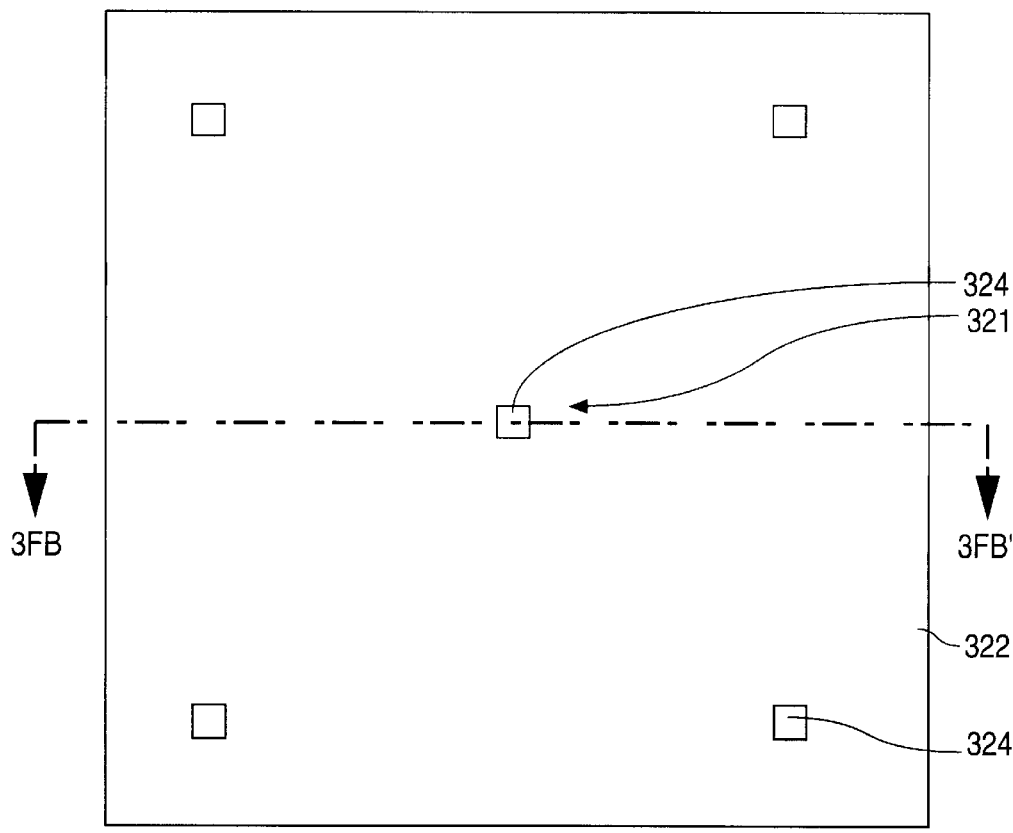
Figure 3F:
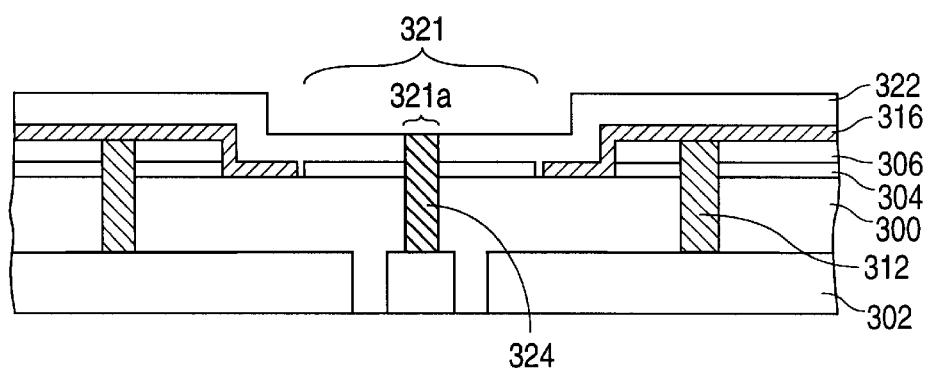

FIGS. 3FA–3FB show deposition of a third dielectric layer 322 over the entire surface. Third dielectric layer 322 will underlie inter-pixel regions of the array. Incident light penetrating third dielectric layer 322 in inter-pixel regions will be reflected by underlying first reflective metal layer 316. Light reflected in inter-pixel regions will thus experience a phase difference relative to incident light reflected by the surface of the array. This difference in phase is due primarily to the longer path length traversed by incident light crossing, and reflected light re-crossing, third dielectric layer 322.

Accordingly, the thickness of third dielectric layer 322 should be specifically tailored to generate constructive interference with light reflected by the surface of the array. Generation of constructive interference between reflected light is described in detail in co-pending U.S. patent application Ser. No. 08/872,013, entitled "REFLECTANCE ENHANCING THIN FILM STACK", filed Jun. 7, 1997 and hereby incorporated by reference.

Second vias 324 are next etched in center portions 321a of second alternate pixel regions 321 through third dielectric layer 322, first dielectric layer 304, and intermetal dielectric 300 to stop on interconnect metallization 302. Second vias 324 are then filled with electrically conducting material, typically tungsten.

Figure 3G:
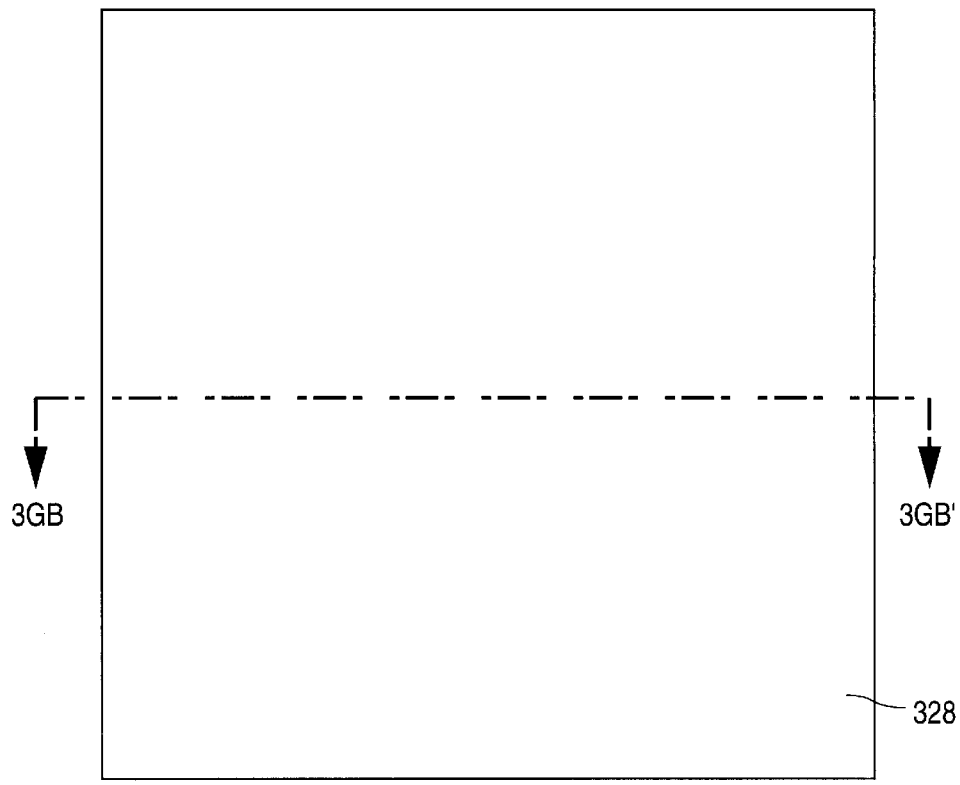
Figure 3G:
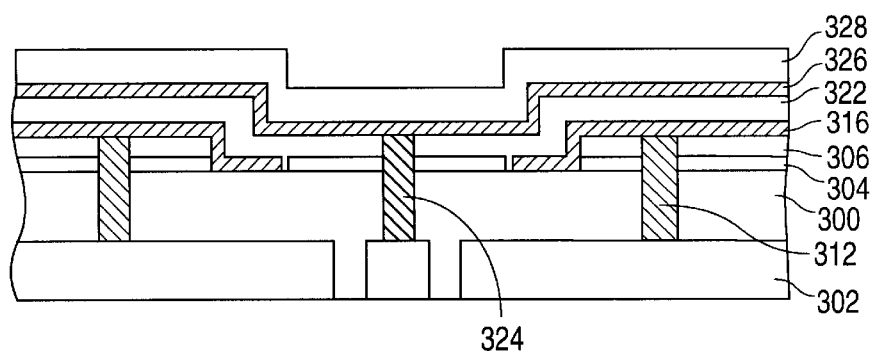

FIGS. 3GA–3GB show formation of a second reflective metal layer 326 over the entire surface, followed by formation of a fourth dielectric layer 328 over second reflective metal layer 326.

Figure 3H:
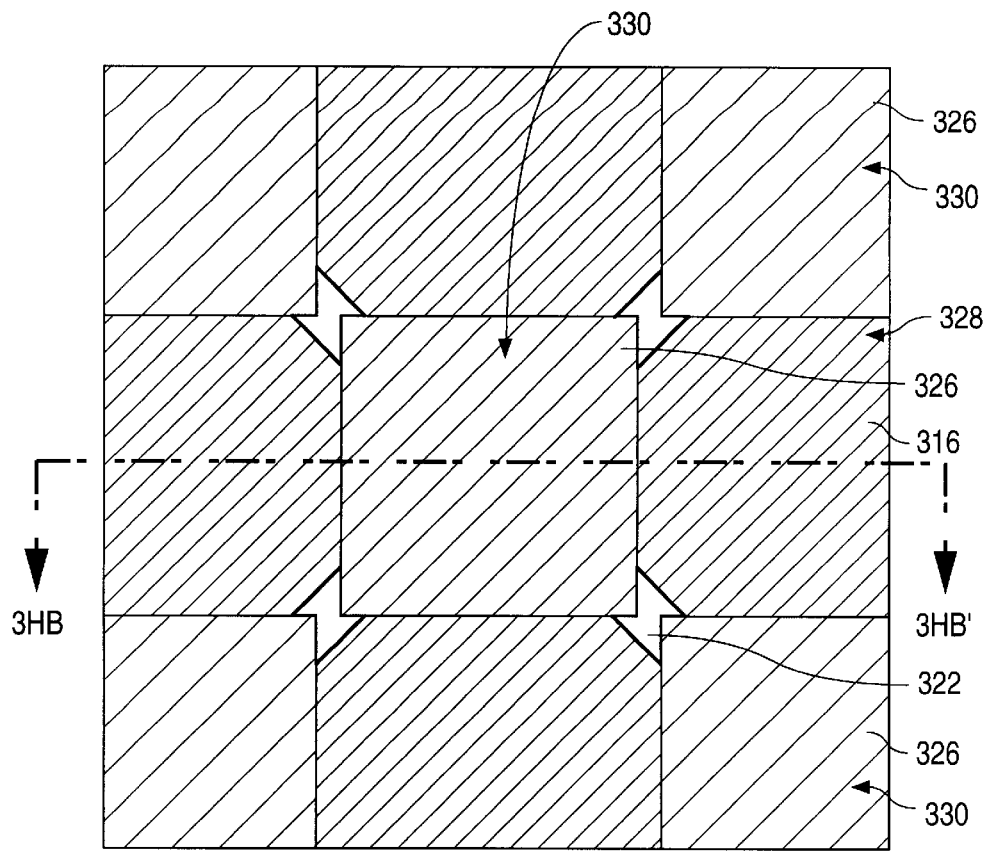
Figure 3H:
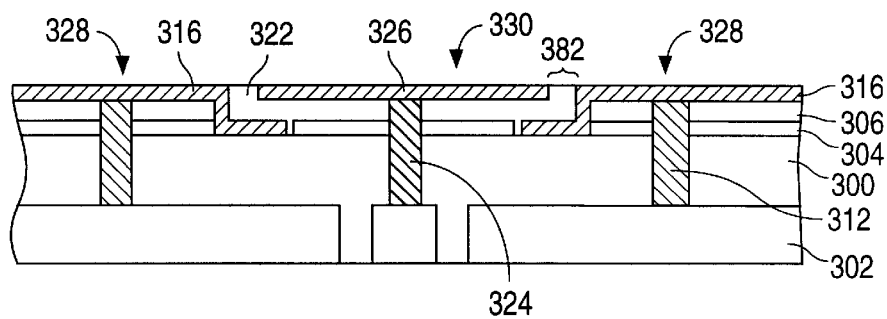

FIGS. 3HA–3HB show the final step of the process flow in accordance with a first embodiment of the present invention, wherein the surface of the array is chemical-mechanical polished. Specifically, chemical mechanical polishing is performed through upper portions of second reflective metal layer 326 to stop on first reflective metal layer 316 and second reflective metal layer 326. This reveals discrete reflective metal pixel electrodes 328 and 330, electrically coupled with interconnect metallization layer 302 through first vias 312 and second vias 324, respectively.

First and second reflective pixel electrodes 328 and 330 are separated by remaining third oxide layer 322. Third oxide layer 322 in inter-pixel regions 332 is not shown in FIG. 3HA, as this layer is substantially transparent.

Fabrication of the liquid crystal silicon light valve is completed by adding liquid crystal material, and then sealing a translucent top plate over the structure.

The thin LC transducer pixel cell and the process for forming this pixel cell in accordance with the present invention offers a number of important advantages. One advantage is that light incident to inter-pixel regions is reflected by the underlying edges of adjacent pixels rather than being absorbed into the substrate. This prevents the appearance of dark lines associated with the absorption of light, and also shields the underlying substrate from the unwanted currents generated by light leakage.

Although the invention has been described in connection with one specific preferred embodiment, it must be understood that the invention as claimed should not be unduly limited to this embodiment. Various other modifications and alterations in the structure and process will be apparent to those skilled in the art without departing from the scope of the present invention.

For example, as shown in FIG. 3BA, the photoresist layer forming the first photoresist mask 308 may be specifically patterned to exclude corners of pixel regions, thereby providing space for dielectric material between diagonally-situated pixels. However, there are several possible alternatives to this step.

Figure 4:
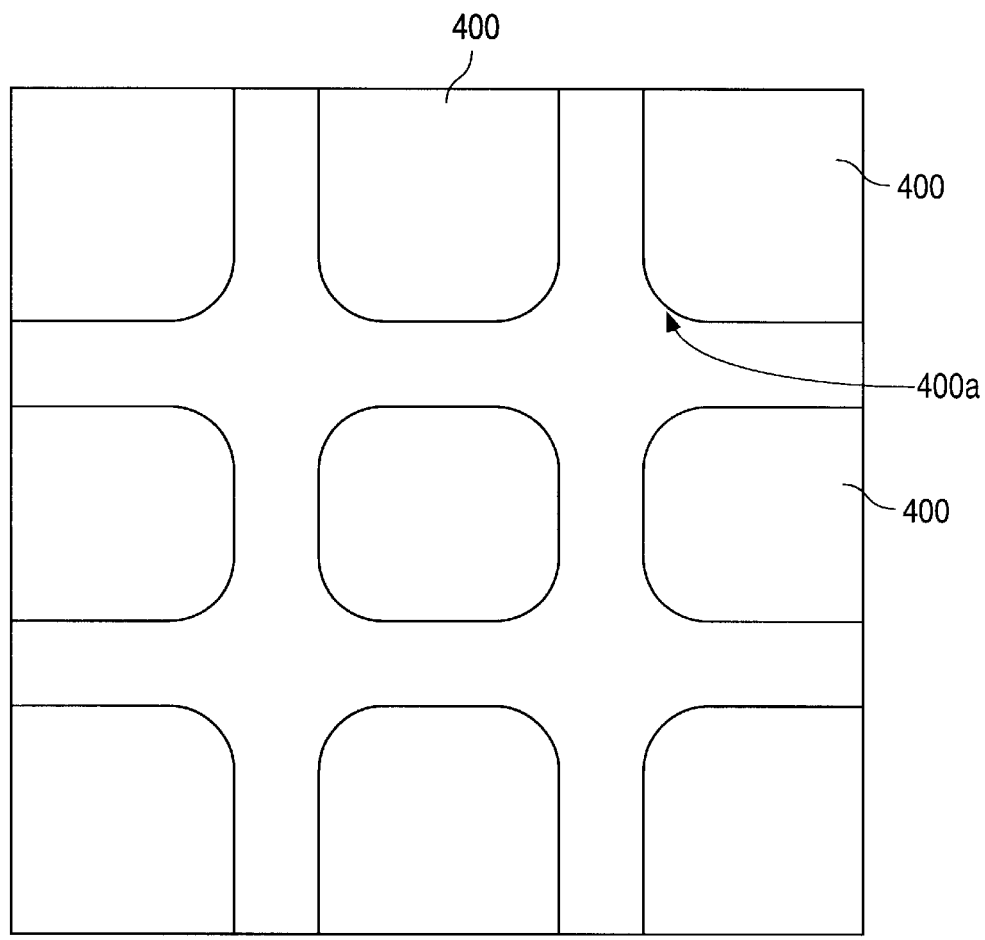
FIG. 4 shows a plan view of a masking step in a process flow in accordance with an alternative embodiment of the present invention.

FIG. 4 shows a plan view of a photoresist masking step in a process flow in accordance with an alternative embodiment of the present invention. In FIG. 4, first photoresist mask 400 is formed by patterning a photoresist layer in a precise checkerboard pattern, followed by carefully over-exposing the photoresist layer during development. As a result of this calculated over-exposure, corners 400a of first photoresist mask 400 are rounded and exclude corner portions 400a.

Figure 5A:
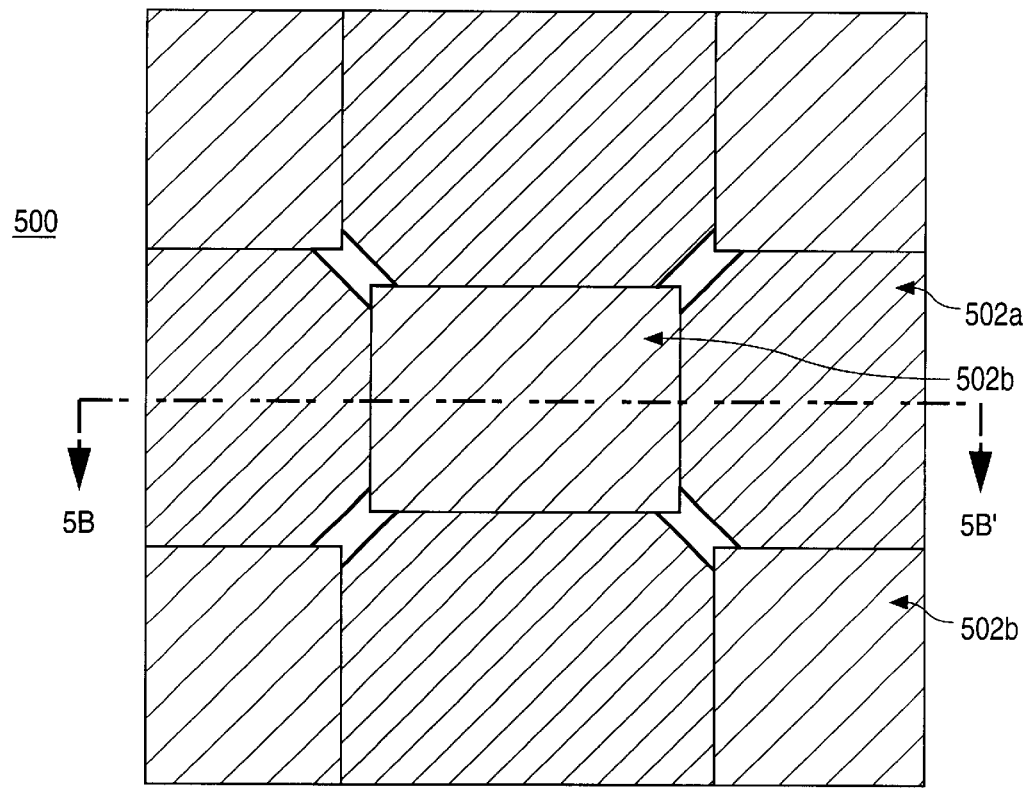
FIGS. 5A–5B show plan and cross-sectional views of adjacent pixel cells in a pixel array in accordance with a second embodiment of the present invention.
Figure 5B:
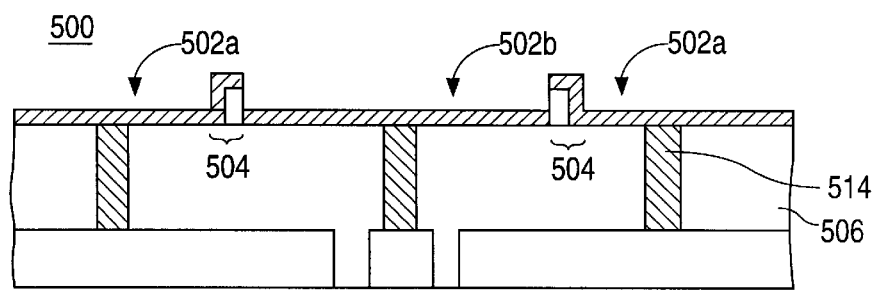

Yet another possible embodiment of the present invention is illustrated in FIGS. 5A and 5B, which show plan and cross-sectional views, respectively, of an alternative reflective metal pixel array. Pixel array portion 500 includes adjacent pixel electrodes 502a and 502b separated by inter-pixel regions 504. Electrodes 502a and 502b are formed over intermetal dielectric layer 506, and communicate with underlying interconnect metallization layer 512 through metal-filled vias 514.

The raised edges of first reflective pixel electrodes 502a overlie inter-pixel regions 504. The overlapping arrangement of adjacent electrodes 502a and 502b promotes the uniform brightness of the array. This is because the overlying edge of first reflective pixels 502a reflect incident light that would otherwise penetrate through dielectric layer 506 in inter-pixel regions 504. This ensures that dark lines indicating absorption of incident light do not appear in the light valve display.

Figure 6A:
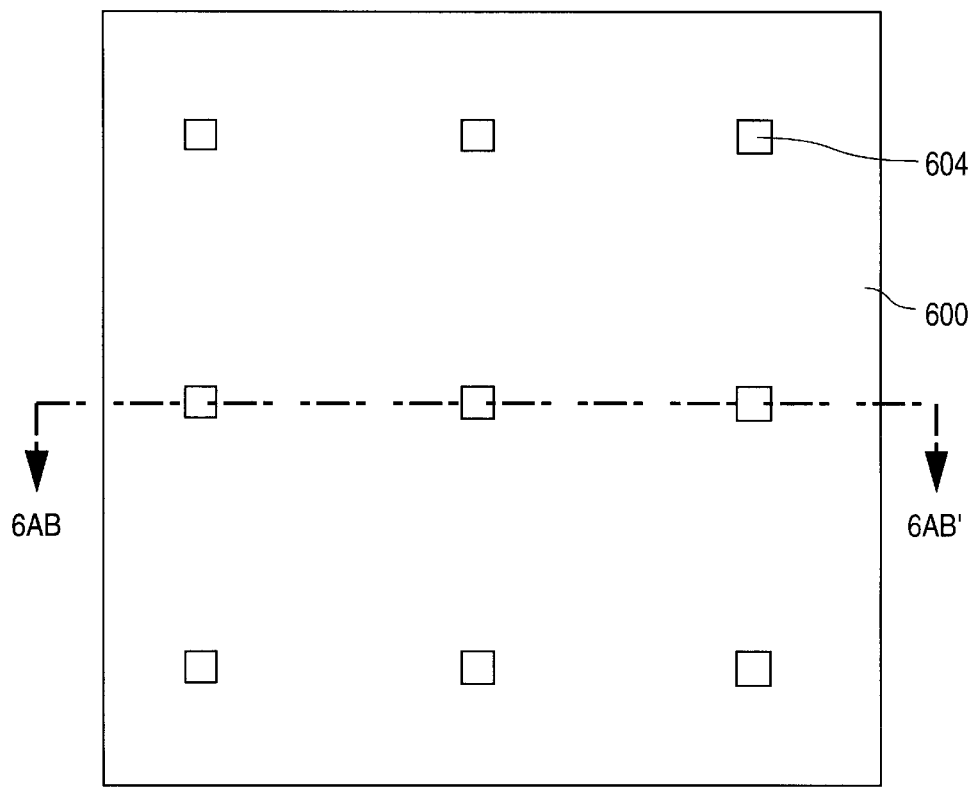
FIGS. 6AA–6FB show plan and cross-sectional views of the process steps for forming an array of pixel cells in accordance with the second embodiment of the present invention.
Figure 6A:
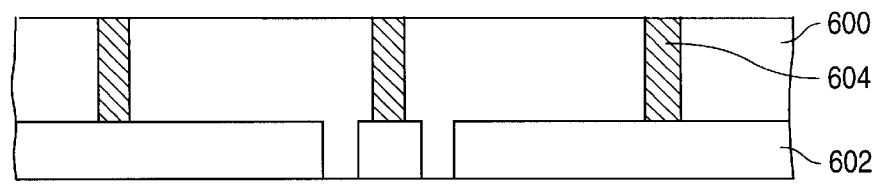

FIGS. 6AA–6FB illustrate the process steps for forming an array of pixel cells in a light valve in accordance with the first embodiment of the present invention. For purposes of convention, all FIG. 6XA illustrate a plan view of the pixel cell array, and all FIG. 6XB illustrate a cross-sectional view of the pixel cell array along line A–A' of the FIG. 6XA.

FIGS. 6AA–6BA show the starting point for the process. Intermetal dielectric layer 600 is formed over interconnect metallization layer 602. Vias 604 are etched through intermetal dielectric 600 to stop an interconnect metallization layer 602. Vias 604 are then filled with electrically conducting material, and the electrically-conducting material is removed outside of vias 604.

Figure 6B:
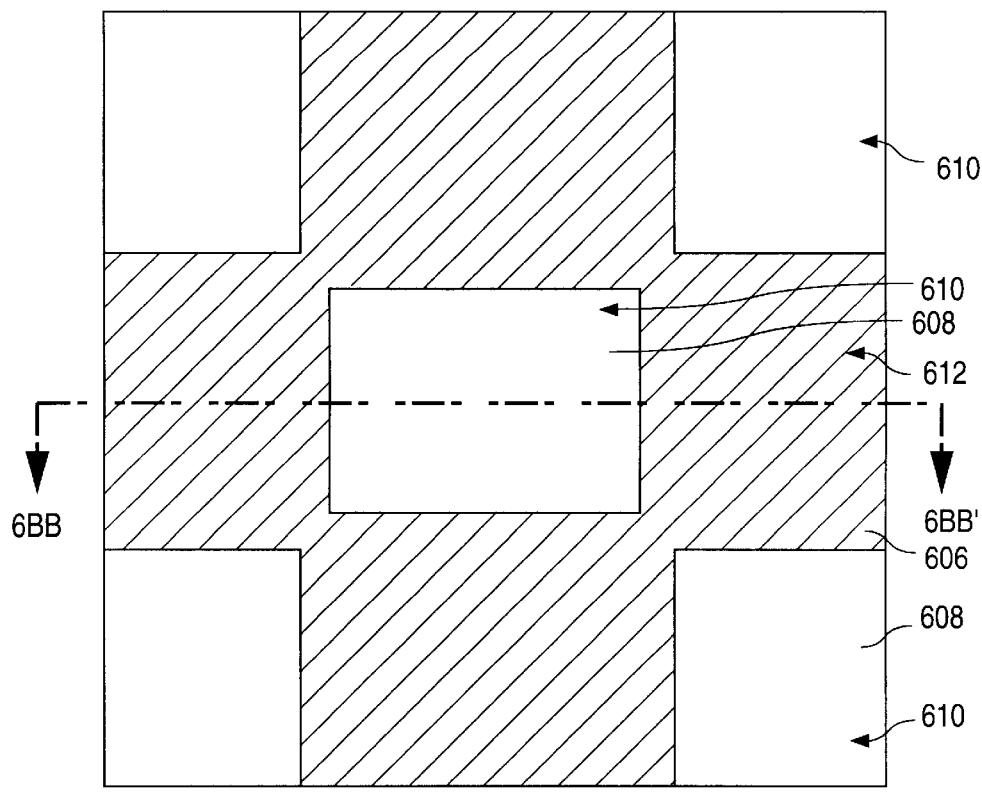
Figure 6B:
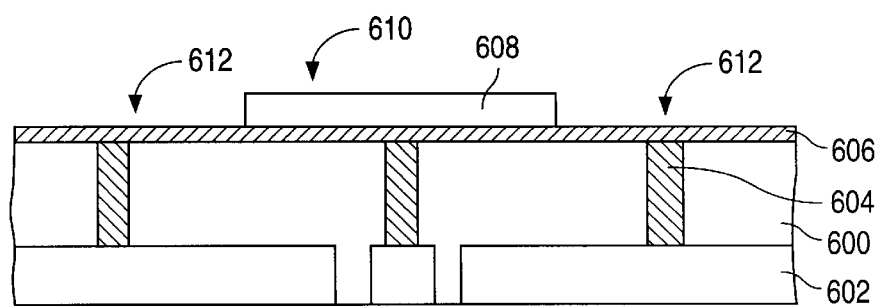

FIGS. 6BA–6BB show the next step, wherein first reflective metal layer 606 is formed over the entire surface. First photoresist mask 608 is then patterned such that first pixel regions 610 are masked, while second pixel regions 612 are exposed.

Figure 6C:
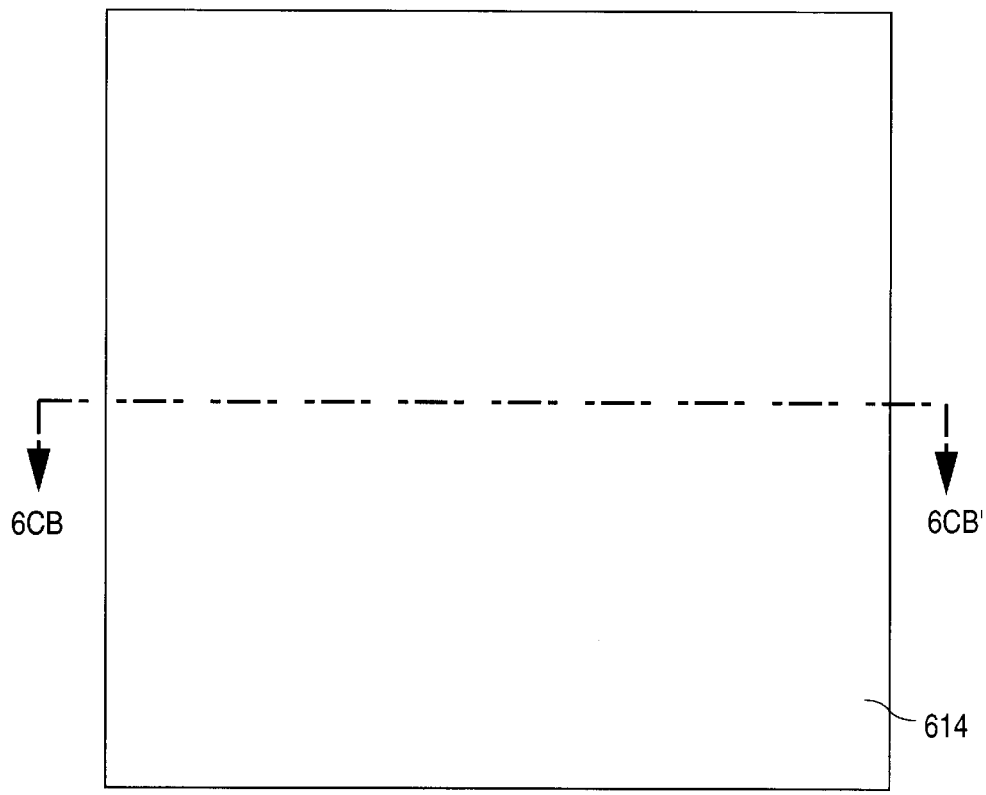
Figure 6C:
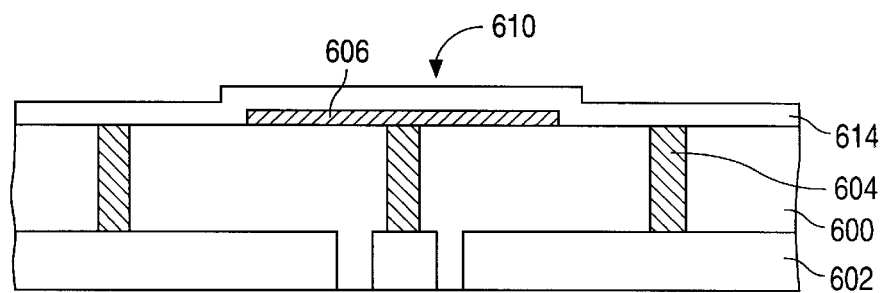

FIGS. 6CA–6CB show etching of first reflective metal layer 606 to stop on intermetal dielectric layer 600 in second pixel regions 612 unprotected by first photoresist mask 608. First photoresist mask 608 is then stripped, and first dielectric layer 614 is formed over the entire surface, including portions of first reflective metal layer 606 remaining in first pixel regions 610.

Figure 6D:
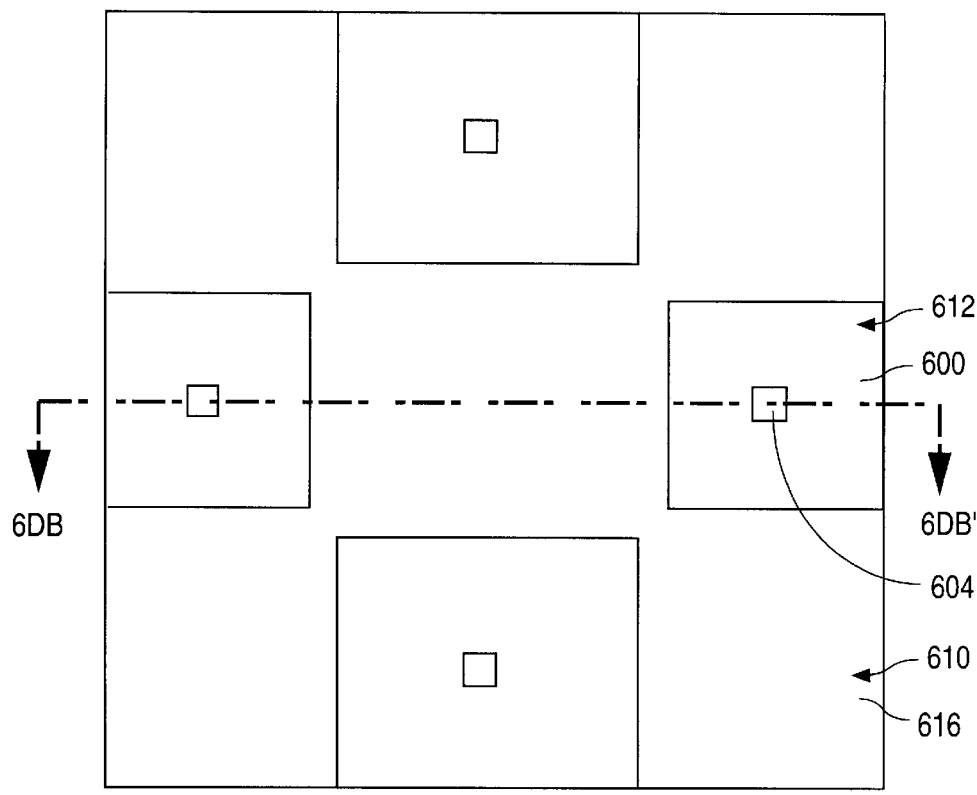
Figure 6D:
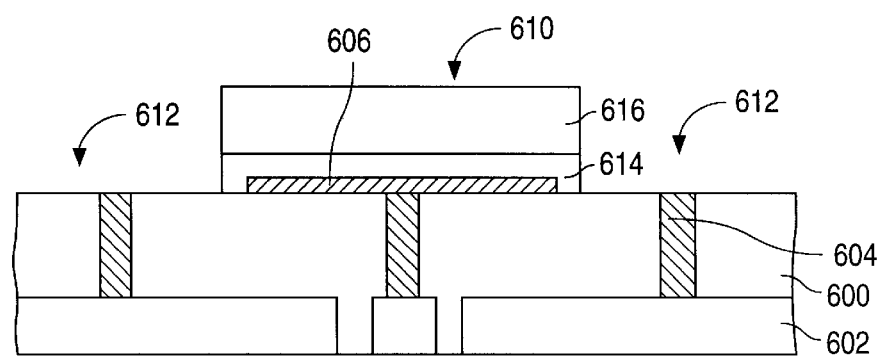

FIGS. 6DA–6DB show patterning of second photoresist mask 616 over portions of dielectric layer 614 overlying first pixel regions 610. Portions of first dielectric layer 614 exposed by second photoresist mask 616 are then etched to stop on underlying intermetal dielectric layer 600. Where both first dielectric layer 614 and intermetal dielectric 600 are formed from silicon oxide, a thin silicon nitride layer formed prior to dielectric layer 616 can serve as an etch stop.

Figure 6E:
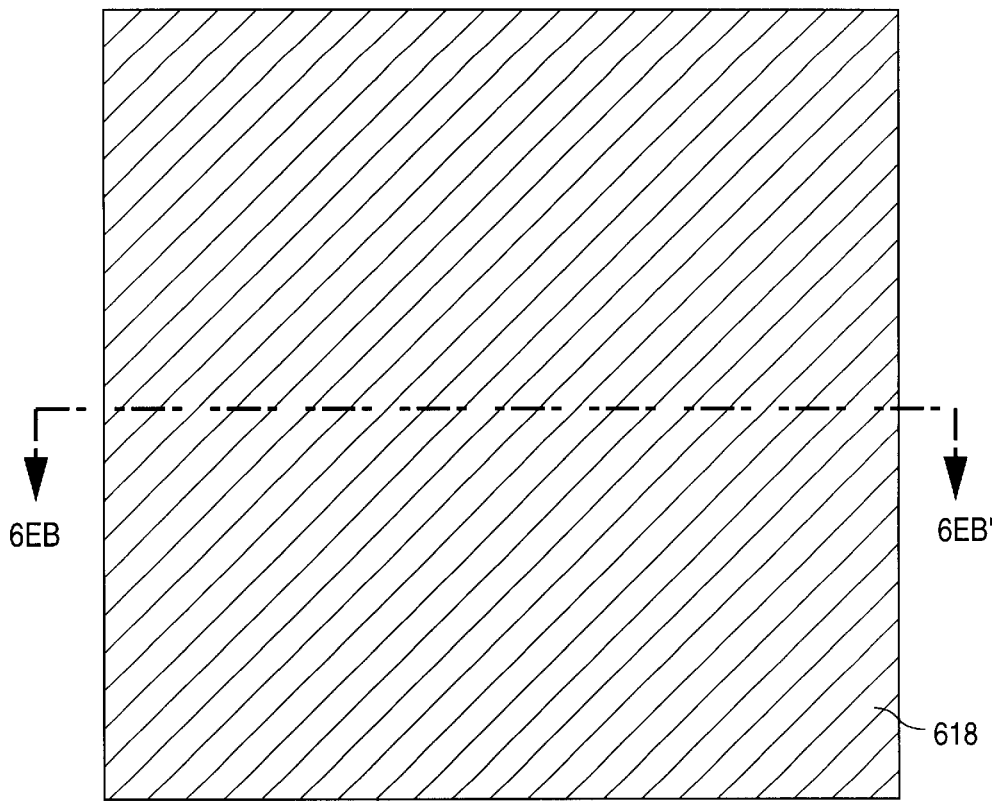
Figure 6E:
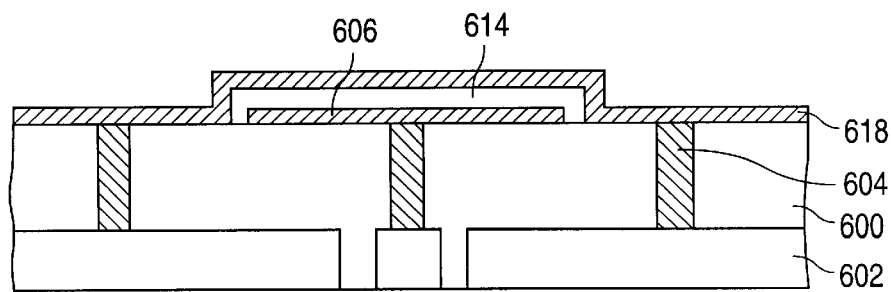

FIGS. 6EA–6EB show the removal of second photoresist mask 616, followed by the formation of second reflective metal layer 618 over the entire surface.

Figure 6F:
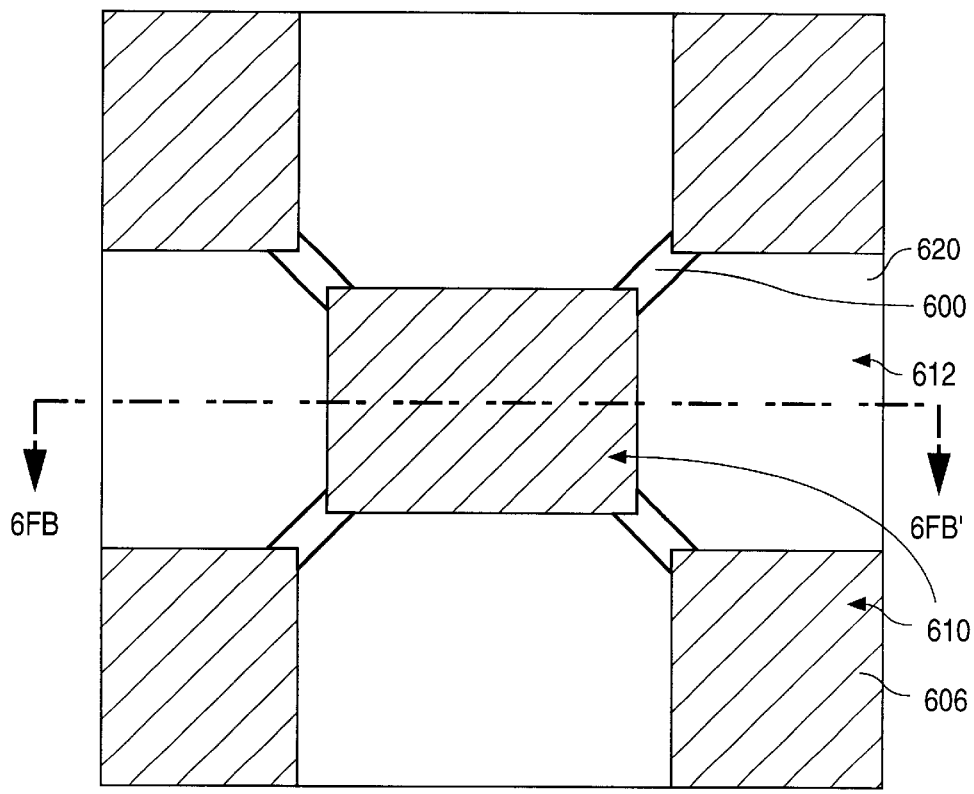
Figure 6F:
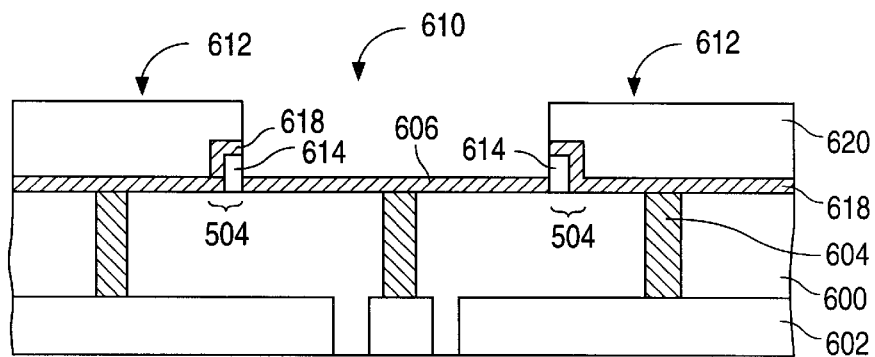

FIGS. 6FA–6FB show the patterning of third photoresist mask 620 such that first pixel regions 610 are unmasked. Exposed portions of second reflective metal layer 618 are then etched selective to first dielectric layer 614, and exposed portions of first dielectric layer 614 are then etched selective to underlying first reflective metal layer 606. Subsequent removal of third photoresist mask 620 reveals the complete pixel array shown in FIGS 5A–5B.

The second embodiment of the present invention continues to offer the advantage of blocking penetration of incident light into the underlying substrate in inter-pixel regions, thereby preventing unwanted flickering. The second embodiment also presents the appearance of dark lines in light-absorbing inter-pixel regions.

However, the second embodiment depicted in FIGS. 5A–5B and 6AA–6FB is less favored than the first embodiment for several reasons. First, the overlapping edges of the pixels create unwanted surface topography. Incident light can scatter off of these raised features, degrading the overall reflectance of the array.

Additionally, the process for forming the second embodiment calls for etching through the second reflective metal layer and first dielectric layer to stop on the first reflective metal layer. This first metal layer ultimately serves a reflective pixel electrode, and exposing it to etchant during this step can roughen the surface of the metal and degrade its reflectance.

However, it should also be recognized that the second embodiment of the present invention offers certain advantages over the first embodiment. For example, the alignment tolerance for the third photoresist masking step is relatively large, as etching can take place at any point within the first pixel regions.

Given the plurality of possible specific embodiments of the present invention, it is intended that the following claims define the scope of the invention, and that methods and structures falling within the scope of these claims and their equivalents be covered thereby.

What is claimed is:

1. A process for forming a pixel array comprising the steps of:

forming an intermetal dielectric layer over an interconnect metallization layer;

forming a first dielectric layer over the intermetal dielectric layer, the first dielectric layer different than the intermetal dielectric layer;

forming a second dielectric layer over the first dielectric layer, the second dielectric layer different than the first intermetal dielectric layer;

patterning a trench photoresist mask over the second dielectric layer, the trench photoresist mask masking pixel regions and exposing inter-pixel regions;

creating a trench by etching the second dielectric layer and the first dielectric layer in inter-pixel regions to stop on the intermetal dielectric layer;

removing the trench photoresist mask;

forming a reflective metal layer over the second dielectric layer and within the trench;

patterning a pixel photoresist mask over the reflective metal layer, the pixel photoresist mask masking first alternative pixel regions and exposing second alternative pixel regions;

etching the reflective metal layer and the second dielectric layer in second alternative pixel regions to stop on the first dielectric layer;

forming a third dielectric layer over the reflective metal layer in first alternative pixel regions and over the first dielectric layer in second alternative pixel regions;

forming a second reflective metal layer over the third dielectric layer, the second reflective metal layer having a raised portion in first alternative pixel regions and a lower portion in second alternative pixel regions;

forming a fourth dielectric layer over the second reflective metal layer; and chemical mechanical polishing through the fourth dielectric layer, the raised portion of the second reflective metal layer, and the third dielectric layer to stop on the first reflective metal layer and the lower portion of the second reflective metal layer, such that first pixels are formed in first alternate pixel regions from the first reflective metal layer and second pixels are formed in the second alternate pixel regions from the lower portion of the second reflective metal layer, the first and second pixels separated and electrically isolated from one another by the third dielectric layer.

2. The process according to claim 1 wherein the step of forming the first dielectric layer comprises forming a layer of silicon nitride, and the step of forming the second dielectric layer comprises forming a layer of silicon oxide.

3. A silicon light valve pixel array formed by the process of claim 1.

4. A process for forming a pixel array comprising the steps of:

forming an intermetal dielectric layer on top of an interconnect metallization layer;

forming a plurality of electrically conducting vias extending through the intermetal dielectric layer to contact the interconnect metallization layer;

forming a first reflective metal layer over the vias and the intermetal dielectric;

forming a first pixel photoresist mask to cover first pixel regions and to exclude second pixel regions;

etching the first reflective metal layer in second pixel regions exposed by the first pixel photoresist mask;

removing the first pixel photoresist mask;

forming a first dielectric layer over the intermetal dielectric, the vias, and first reflective metal layer remaining in the first pixel regions;

forming a second reflective metal layer over the first dielectric layer;

forming a second pixel photoresist mask over the second reflective metal layer to cover the second pixel regions and to expose the first pixel regions;

etching the second reflective metal layer in exposed first pixel regions selective to the first dielectric layer; and etching the first dielectric layer in exposed first pixel regions selective to the first reflective metal layer.

5. A silicon light valve pixel array formed by the process of claim 4.

* * * * *